Patented Feb. 21, 1939

2,148,146

UNITED STATES PATENT OFFICE 2,148,146

DIAZO COMPOUNDS

Frithjof Zwilgmeyer, Arden, Del., assignor to E. I. du Pont de Nemours & Company, Wilmington, Del., a corporation of Delaware No Drawing. Application December 1, 1937, Serial No. 177,483

15 Claims. (Cl. 260—164)

The present invention relates to new azo compounds, and especially to new ice colors which are represented by the general formula

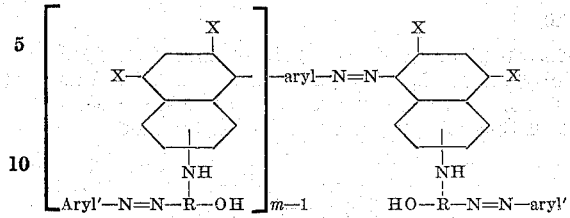

in which aryl and aryl' represent aromatic nuclei of the benzene, naphthalene, anthraquinone, azo-benzene, diphenyl, diphenyl-ether and carbazole series, one X represents hydroxy and the other X represents hydrogen, aryl and aryl' may be substituted once or more than once by any radical which does not impart water solubility to the products, R is the residue of a dihydroxy benzene compound having a free coupling position and which is free from carboxy and sulfonic acid groups, and $m$ is an integer 1 or 2 depending upon whether aryl is the residue of a mono-amine or a diamine compound. The invention also relates to dyeings produced by the new compounds and to processes of making the compounds and dyeings.

It is an object of the invention to provide new colored azo compounds, and especially compounds which can be applied to fibres by ice color methods. Another object of the invention is to provide for brown to black dyeings of good fastness properties on textile materials, such as cotton, regenerated cellulose and similar materials. Another object is to provide textiles dyed with the new dyes. Still another object is to provide processes for preparing the colors and the dyed materials. Further objects of the invention will be apparent from the following description.

The objects of the invention are attained in general by coupling any diazotized aryl amine compound having a nucleus, aryl' to a coupling component made by condensing at least one equivalent of a dihydroxy benzene compound which is devoid of carboxy and sulfonic acid groups with a compound represented by the formula

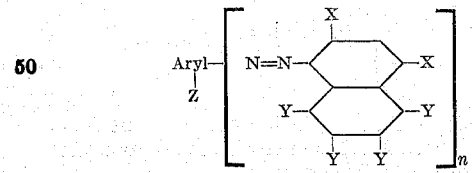

in which one X is hydroxy and the other X is hydrogen, one Y is amino and the other Y's are hydrogen and aryl is the residue of a primary aryl amine from the group consisting of benzene, naphthalene, anthraquinone, azo-benzene, diphenyl, diphenyl-ether and carbazole compounds which are devoid of carboxy and sulfonic acid groups, $n$ is an integer not greater than 2, and Z is at least one of the group consisting of hydrogen, alkyl, alkoxy, halogen, nitro, acylamino and trifluoromethyl.

On fibres and textile materials the dyeings are made in general by padding the goods with an alkaline solution of the coupling component and then applying a diazo solution of the color base or; by printing on the fibres with printing paste containing the coupling component and the diazo base in a form which will not couple in alkaline medium, such as a nitrosamino or a diazoimino compound of the diazotized base, and then developing by the action of mild acid and heat. The objects of the invention may also be attained by mixing the components of the color in solution and acidifying whereby the color is made in substance.

The invention will be more fully understood by reference to the following more detailed description in connection with which examples are given which are illustrative but not limitative of the invention.

Example I

A printing paste was prepared by mixing 3.4 parts of the coupling component represented by the formula

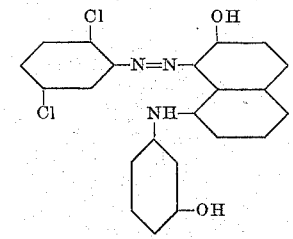

obtained by coupling diazotized 2:5-chloraniline under alkaline conditions with 1:7-amino-naphthol, then condensing the coupled product with resorcin, 2.6 parts of the water soluble diazoimino compound represented by the formula

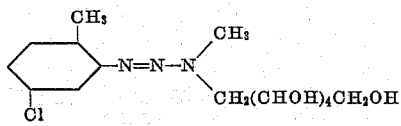

obtained by reacting diazotized 4-chlor-2-amino-toluene with methyl glucamine, 3.0 parts of sodium hydroxide solution of 35% strength,
65.0 parts of starch tragacanth thickener prepared from 80 parts of wheat starch, 360 parts of a 6% solution of gum tragacanth and 560 parts of water, and
26.0 parts of water
———
100.0

Cotton piece goods was printed from an engraved roll with the paste and the prints were dried in the air. The color was developed by subjecting the prints to the action of live steam containing the vapors of acetic acid. The printed goods were rinsed with water, boiled for five minutes in a 0.5% soap solution, again rinsed and dried. The pattern was developed as a deep dark brown dyeing of excellent fastness to washing. The new color is represented by the formula

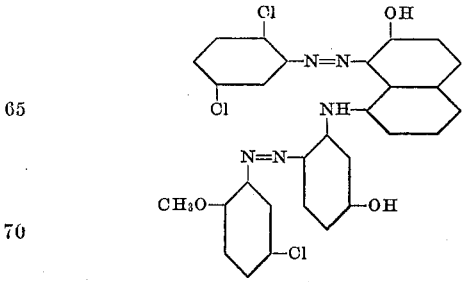

*Example II*

A printing paste was prepared according to the following formula:

3.4 parts of the coupling component described in Example I,
2.6 parts of the water soluble diazoimino compound of the formula:

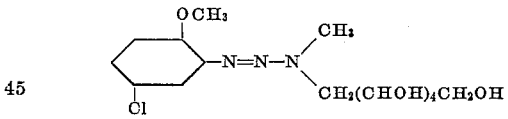

obtained by the action of diazotized 4-chlor-2-amino-anisole on methyl glucamine,
3.0 parts of sodium hydroxide of 35% strength,
65.0 parts of the starch-tragacanth thickener described in Example I and
26.0 parts of water
———
100.0

Cotton piece goods was printed and developed as described in Example I. The printed pattern was a deep dark brown dyeing of outstanding fastness to washing. The color is represented by the formula:

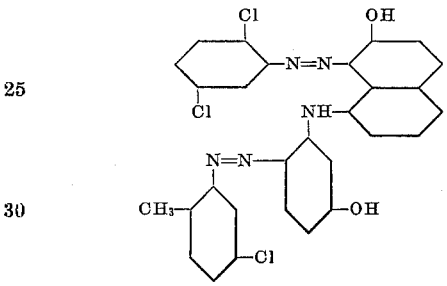

*Example III*

A printing paste was prepared according to the following formula:

3.4 parts of the coupling component represented by the formula:

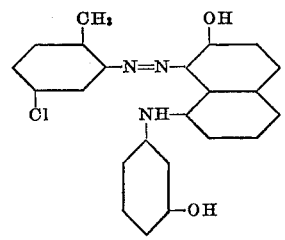

obtained by diazotizing 4-chlor-2-aminotoluene, coupling under alkaline conditions with 1:7-amino-naphthol and then condensing with resorcin.
2.6 parts of the water soluble diazoimino compound of Example II,
3.0 parts of sodium hydroxide solution of 35% strength,
65.0 parts of starch-tragacanth thickener, and
26.0 parts water.
———
100.0

Cotton piece goods was printed and developed as in Example I. The pattern was developed as a dark brown dyeing of excellent fastness to washing. The color is represented by the formula:

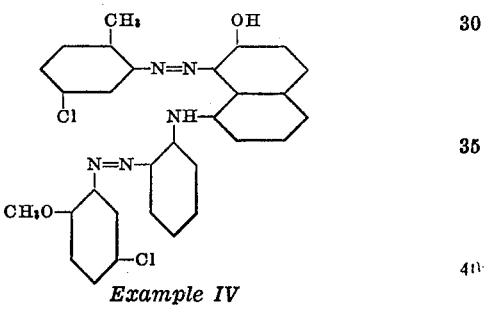

*Example IV*

A printing paste was prepared according to the following formula:

3.4 parts of the coupling component of Example III,
2.6 parts of the water soluble diazoimino compound of Example I,
3.0 parts of sodium hydroxide solution of 30% strength,
65.0 parts of starch-tragacanth thickener, and
26.0 parts water.
———
100.0

Cotton piece goods was printed and developed as described in Example I. The developed pattern was a deep dark brown of excellent washing fastness. The new color is represented by the formula:

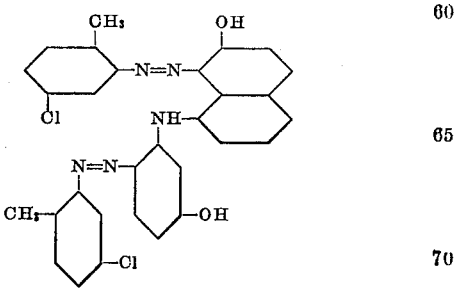

By methods similar to those described the following colors were developed from the compounds hereinafter given. These dyeings had good washing fastness.

| Example No. | Coupling component formula | Diazo component formula | Dyeing produced formula | Shade |
|---|---|---|---|---|
| 5 | Obtained by diazotizing 4-chloro-2-nitro-aniline, coupling alkaline with 1,7-amino-naphthol, then condensing with resorcin. | | | Dark Brown. |
| 6 | Obtained by diazotizing alpha-amino-anthraquinone, coupling alkaline to 1,7-amino-naphthol, then condensing with resorcin. | | | Do. |
| 7 | Obtained by diazotizing beta-amino-anthraquinone, coupling alkaline to 1,7-amino-naphthol then condensing with resorcin. | | | Do. |

| Example No. | Coupling component formula | Diazo component formula | Dyeing produced formula | Shade |
|---|---|---|---|---|
| 8 | Obtained by tetrazotizing tolidine and coupling alkaline to 2 moles of 1.7 amino-naphthol then condensing with resorcin. | | | Dark Brown. |
| 9 | Obtained by tetrazotizing tolidine-sulfone, coupling alkaline to 2 moles of 1.7-amino-naphthol, then condensing with resorcin. | | | Do. |
| 10 | Obtained by diazotizing 4'-dimethyl-amino-4-amino-azo-benzene, coupling alkaline to 1.7-amino naphthol, then condensing with resorcin. | | | Do. |

| Example No. | Coupling component formula | Diazo component formula | Dyeing produced formula | Shade |
|---|---|---|---|---|
| 11 | (naphthol-azo-NH-resorcinol structure) Obtained by diazotizing 3-amino-carbazole, coupling alkaline, to 1.7-amino-naphthol, then condensing with resorcin. | (OCH₃, Cl substituted phenyl-N=N-N(CH₂(CHOH)₄CH₂OH)₂ structure) | (carbazole-NH-naphthol-azo-NH-resorcinol with chloro-methoxy-phenyl-azo) | Dark Brown. |
| 12 | (dichlorophenyl-NH-naphthol-OH with resorcinol-OH structure) Obtained by diazotizing 2,5-di-chloro-aniline, coupling alkaline, to 1,5-amino-naphthol, then condensing with resorcin. | (OCH₃, Cl phenyl-N=N-N(CH₃)(CH₂(CHOH)₄CH₂OH)) | (dyeing structure) | Do. |
| 13 | (OCH₃, Cl phenyl-NH-naphthol-OH with resorcinol-OH) Obtained by diazotizing 4-chloro-2-amino-anisole, coupling alkaline, to 1,5-amino-naphthol, then condensing with resorcin. | (OCH₃, Cl phenyl-N=N-N(CH₃)(CH₂(CHOH)₄CH₂OH)) | (dyeing structure) | Do. |

| Example No. | Coupling component formula | Diazo component formula | Dyeing produced formula | Shade |
|---|---|---|---|---|
| 14 | 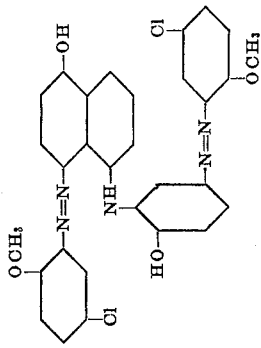 Obtained by diazotizing 4-chloro-2-amino-anisole, coupling alkaline, to 1,5-amino-naphthol, then condensing with catechol. | 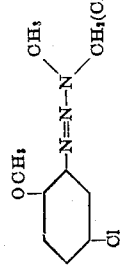 | 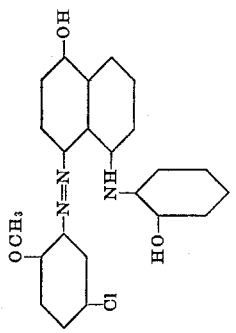 | Brown. |

The foregoing examples describe only a few of the many new ice colors which are obtainable according to the present invention since many variations can be made in the components.

Any dihydroxy benzene, such as an ortho- or para-dihydroxy benzene can be used instead of resorcinol in the preparation of the coupling component. Aryl may be selected from the group of amino substituted compounds of benzene naphthalene, anthraquinone, azo-benzene, diphenylamine, diphenyl-ether and carbazole which may be substituted by one or more than one of the group consisting of hydrogen, alkyl, alkoxy, halogen, nitro, acylamino and trifluoro-methyl, but not by carboxy and sulfonic acid. When aryl carries more than one diazotizable amino group, one or more than one equivalent of a 2- or a 4-hydroxy naphthylamine can be coupled, or all but one coupled group may be displaced by another azo dye coupling component which is free from solubilizing groups. When more than one equivalent of a 2- or a 4-hydroxy-naphthylamine is coupled to the base, one or more than one of the amino groups of the hydroxy-naphthylamine may be condensed with the dihydroxy benzene compound.

Among the many suitable amino substituted bases which can be used in making the coupling component in addition to those hereinbefore indicated, the following are mentioned:

Aniline, meta-chlor-aniline, p-nitro-aniline, 4-nitro-2-amino-anisole, 4-chloro-2-amino-anisole, 5-chloro-2-aminotoluene, 3-amino-benzo-trifluoride, ortho-phenetidine, 4-benzoyl-amino-2:5-diethoxy-aniline, alpha-naphthylamine, 1-amino-2-methoxy - naphthalene, amino - azo - benzene, benzidine, 4:4'-diamino-diphenylamine, 4:4'-diamino-diphenyl-ether, 4:4'-diamino - azo - benzene, 3-nitro-4-amino-toluene, 2:5-dichloro-aniline, ortho-chloro-aniline, 4-chloro-2-nitro-aniline, N-(para - amino - benzoyl)-aniline, ortho-phenetidine-azo-alpha-naphthyl - amine, para-anisidine - azo-2:5 - dimethoxy - aniline, alpha-amino-anthraquinone, 3-amino-carbazole, dianisidine, and para-amino-diphenyl.

Any primary aryl amine from the group consisting of benzene, naphthalene, anthraquinone, azo-benzene, diphenyl, diphenyl-ether and carbazole compounds which is free from carboxy and sulfonic acid groups can be used, such as the above mentioned aryl amines which are useful as components of the coupling components. The aryl nucleus of the amino base may be substituted once or more by water-non-solubilizing substituents, such as alkyl, alkoxy, halogen, nitro, acylamine and trifluoro-methyl, but not by carboxy and sulfonic acid.

In the specification and claims alkyl and alkoxy refer to methyl, ethyl, propyl, butyl and even longer straight and branched chain aliphatic groups and the corresponding alkoxy groups. Acylamino refers to alkacylamino and aryl-amino groups.

As numerous variations besides those which have been specifically mentioned can be made without departing from the spirit and scope of the invention as will be understood by those skilled in the art, it is to be understood that no limitations are intended in the annexed claims except those which are specifically recited or are imposed by the prior art.

I claim:
1. The compounds represented by the formula:

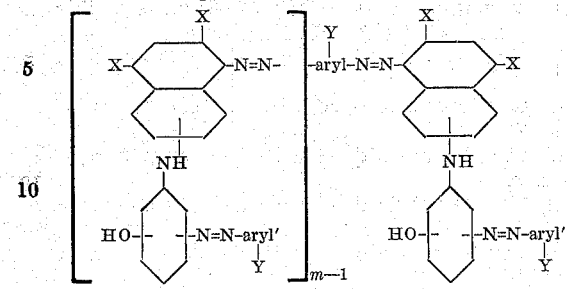

in which aryl and aryl' are radicals from the group consisting of benzene, naphthalene, anthraquinone, azo-benzene, diphenyl, diphenylether and carbazole compounds, Y is at least one of the group consisting of hydrogen, alkyl, alkoxy, halogen, nitro, acylamino and trifluoro-methyl, one X is hydrogen and the other X is hydroxy, and m is an integer not greater than 2.

2. The compounds represented by the formula:

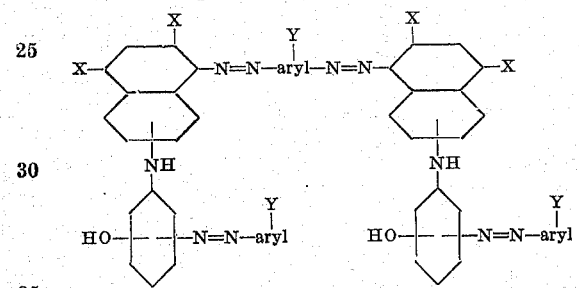

in which one X is hydrogen and the other X is hydroxy, aryl is the residue of one of the group consisting of benzene, naphthalene, anthraquinone, azo-benzene, diphenyl, diphenylether, and carbazole compounds, and Y is at least one of the group consisting of hydrogen, alkyl, alkoxy, halogen, nitro, acylamino and trifluoro-methyl.

3. The compounds represented by the formula:

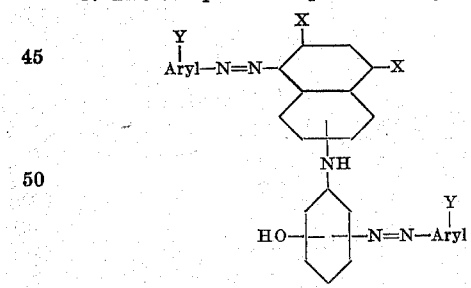

in which aryl is the radical of one of the group consisting of benzene, naphthalene, anthrazene, azo-benzene, diphenyl, diphenyl-ether and carbazole compounds, Y is at least one of the group consisting of hydrogen, alkyl, alkoxy, halogen, nitro, acylamino, and trifluoro-methyl; and one X is hydrogen and the other X is hydroxy.

4. The compounds represented by the formula:

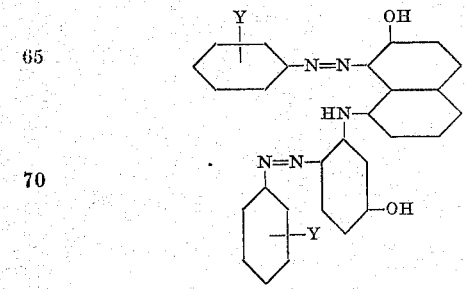

in which Y is at least one of the group consisting of alkyl, alkoxy, halogen, nitro, acylamino and trifluoro-methyl.

5. The compound represented by the formula:

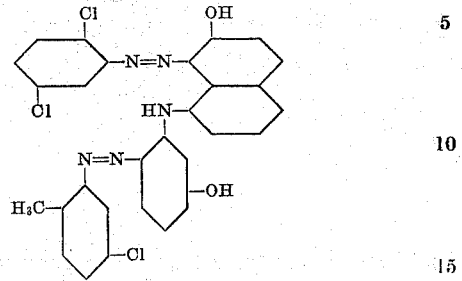

6. The compound represented by the formula:

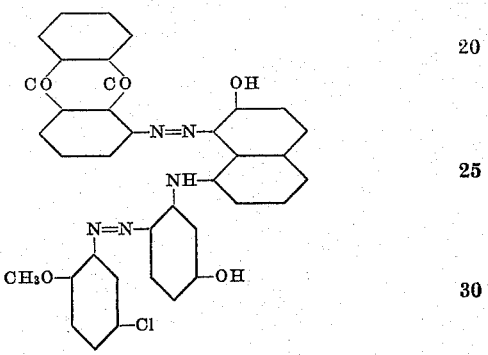

7. The compound represented by the formula:

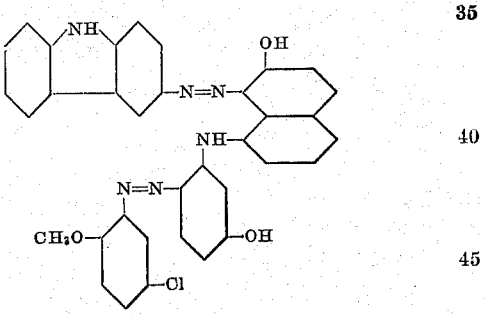

8. The process which comprises diazotizing an aryl amine represented by the formula Y-aryl-(NH₂)ₙ and coupling in non-alkaline medium to a compound represented by the formula:

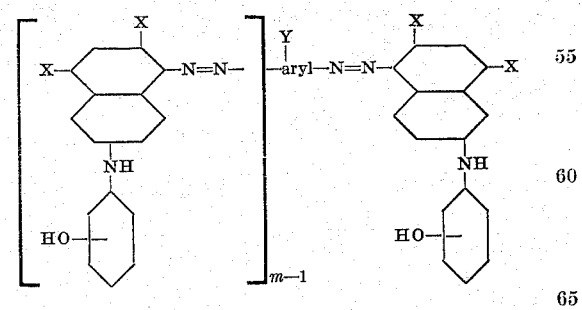

in which formulae aryl is the radical of one of the group consisting of benzene, naphthalene, anthraquinone, azo-benzene, diphenyl, diphenylether and carbazole compounds, Y is at least one of the group consisting of alkyl, alkoxy, halogen, nitro, acylamino and trifluoro-methyl, one X is hydrogen and the other X is hydroxy, and m is an integer not greater than 2.

9. The process which comprises diazotizing an aryl amine represented by the formula Y-aryl- NH₂ and coupling in non-alkaline medium to a compound represented by the formula:

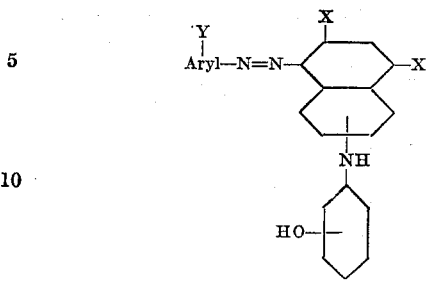

in which formulae aryl is the radical of one of the group consisting of benzene, naphthalene, anthraquinone, azo-benzene, diphenyl, diphenyl-ether and carbazole compounds, Y is at least one of the group consisting of alkyl, alkoxy, halogen, nitro, acylamino and trifluoro-methyl, one X is hydrogen and the other X is hydroxy.

10. Textile fabric dyed with the compound of claim 1.

11. Textile fabric dyed with the compound of claim 2.

12. Textile fabric dyed with the compound of claim 3.

13. Textile fabric dyed with the compound of claim 4.

14. Textile fabric dyed with the compound of claim 5.

15. Textile fabric dyed with the compound of claim 6.

FRITHJOF ZWILGMEYER.